US012658129B2

(12) United States Patent
Seo et al.

(10) Patent No.: US 12,658,129 B2
(45) Date of Patent: Jun. 16, 2026

(54) DISPLAY DEVICE

(71) Applicant: Samsung Display Co., LTD., Yongin-si (KR)

(72) Inventors: Won Jin Seo, Yongin-si (KR); Ki Hyun Pyun, Yongin-si (KR); Jin Mo Kwon, Yongin-si (KR); Ji Young Eom, Yongin-si (KR); Dae Ho Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/893,437

(22) Filed: Sep. 23, 2024

(65) Prior Publication Data

US 2025/0182690 A1 Jun. 5, 2025

(30) Foreign Application Priority Data

Dec. 5, 2023 (KR) ........................ 10-2023-0174203

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/02* (2013.01); *G09G 2320/103* (2013.01); *G09G 2330/021* (2013.01); *G09G 2340/0435* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 8,115,713 | B2 * | 2/2012 | Tagami | G09G 3/3648 345/545 |
| 2014/0333603 | A1 * | 11/2014 | Choi | G09G 3/3233 345/82 |
| 2015/0153877 | A1 * | 6/2015 | Han | G06F 3/0445 345/174 |
| 2021/0035505 | A1 * | 2/2021 | Kwon | G09G 3/3258 |
| 2021/0319740 | A1 * | 10/2021 | Pyun | G09G 3/2007 |

FOREIGN PATENT DOCUMENTS

| | | | |
|---|---|---|---|
| KR | 10-2017-0036938 | A | 4/2017 |
| KR | 10-2020-0036562 | A | 4/2020 |
| KR | 10-2021-0016123 | A | 2/2021 |
| KR | 10-2336004 | B1 | 12/2021 |

* cited by examiner

*Primary Examiner* — Matthew Yeung
(74) *Attorney, Agent, or Firm* — Womble Bond Dickinson (US) LLP

(57) ABSTRACT

The present disclosure relates to a display device. According to one or more embodiments of the disclosure, a display device includes a display panel including a display area, pixels arranged in the display area, and a display-driving circuit configured to determine whether an image includes a still image or a video image, control a supply timing of a data voltage and a pixel-driving control signal to the pixels according to a determination result of the image, delay at least one frame period of a still image display period from one frame period of a video display period, and adjust an image display timing of a next frame in response to a change of a current amount or in a voltage magnitude.

18 Claims, 11 Drawing Sheets

200

DISPLAY DEVICE

CROSS-REFERENCE TO RELATED APPLICATION

The present application claims priority to, and the benefit of, Korean Patent Application No. 10-2023-0174203 filed on Dec. 5, 2023 in the Korean Intellectual Property Office, the contents of which in its entirety are herein incorporated by reference.

BACKGROUND

1. Field

The present disclosure relates to a display device.

2. Description of the Related Art

As the information society develops, demands for display devices for displaying images are increasing in various forms. For example, display devices are applied to various electronic devices, such as smartphones, digital cameras, notebook computers, navigation devices, and smart televisions.

The display device may be a flat panel display device, such as a liquid crystal display device, a field emission display device and an organic light-emitting display device. Among the flat panel display devices, in the light-emitting display device, because each of pixels of a display panel includes a light-emitting element capable of emitting light by itself, an image can be displayed without a backlight unit providing light to the display panel.

In a light-emitting display device, power consumption increases during the period when pixels are charged with the image data voltage among the driving period for each frame that displays an image, and power consumption decreases during the period when the pixels emit light due to the charged image data voltage. Recently, because the pixels are deployed at high resolution to produce ultra-high-quality images, measures are needed to reduce power consumption even during the image display period.

SUMMARY

Aspects of the present disclosure provide a display device capable of reducing power consumption by adjusting an emission period and a frame transition period of pixels according to the display image characteristics, such as still images, moving images, and screen transition images.

Aspects of the present disclosure also provide a display device capable of reducing or preventing image quality degradation due to reduced power consumption by monitoring the amount of current or the magnitude of the voltage supplied to the pixels, and by adjusting the charging period of the image data voltage of the pixels, that is, the frame start period.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to one or more embodiments of the disclosure, a display device includes a display panel including a display area, pixels arranged in the display area, and a display-driving circuit configured to determine whether an image includes a still image or a video image, control a supply timing of a data voltage and a pixel-driving control signal to the pixels according to a determination result of the image, delay at least one frame period of a still image display period from one frame period of a video display period, and adjust an image display timing of a next frame in response to a change of a current amount or in a voltage magnitude.

The display-driving circuit may be further configured to detect a load of the pixels using a maximum grayscale value or a maximum luminance value of image data during the still image display period, and analyze the maximum grayscale value, the maximum luminance value, an average grayscale value, or an average luminance value of the image data to detect the current amount and the voltage magnitude.

The display-driving circuit may be further configured to delay an image display period of a current frame in the still image display period, detect a change of the voltage magnitude and the current amount of a first power line electrically connected to at least one of the pixels, and compare the voltage magnitude or the current amount with a reference voltage magnitude or a reference current amount to control the image display timing of the next frame and the image display period according to a comparison result.

The display-driving circuit may include a maximum grayscale detector for comparing and analyzing grayscale values or luminance values of image data to detect a maximum grayscale value and a maximum luminance value, a load detector for comparing and analyzing the grayscale value or the luminance value to detect a load of at least one of the pixels, an image analyzer for detecting a still image characteristic or a video characteristic of the image data according to a comparison result of the maximum grayscale value, the maximum luminance value, an average grayscale value, or an average luminance value of the image data, and an image display current amount analyzer for detecting the maximum grayscale value, the maximum luminance value, the average grayscale value, or the average luminance value, and for detecting the load, a data voltage magnitude applied to at least one of the pixels, and current amount data or voltage magnitude data flowing to the at least one of the pixels based on the average grayscale value or the average luminance value.

The display-driving circuit may further include an image display voltage detector for detecting a change of the voltage magnitude or the change of the current amount of a first power line electrically connected to the at least one of the pixels, an image display determiner for setting a still image display mode or a video display mode according to the still image characteristic or the video characteristic, for delaying an image display period of a current frame when setting the still image display mode, and for controlling a next frame image display point and an image display period according to the voltage magnitude and the current amount of the first power line, and a panel driver for stopping output of the pixel-driving control signal to delay the image display period of the current frame in the still image display period, and for responding to an image display control signal from the image display determiner to control display of an image of the next frame.

The maximum grayscale detector may be configured to sequentially compare and analyze the grayscale values or the luminance values to detect the maximum grayscale value or the maximum luminance value of at least one frame, and is configured to transmit the maximum grayscale value to the image display current amount analyzer.

The load detector may be configured to calculate the load using the maximum grayscale value, the maximum luminance value, the average grayscale value, or the average luminance value, and using a preset calculation or data base of a memory.

The image analyzer may be configured to respectively compare the maximum grayscale value, the maximum luminance value, the average grayscale value, or the average luminance value of the image data of a previous frame with the maximum grayscale value, the maximum luminance value, the average grayscale value, or the average luminance value of the image data of a current frame to detect the still image characteristic or the video characteristic of the image data of the current frame.

The image display voltage detector may be configured to detect the change of the voltage magnitude or the current amount at one terminal of the first power line commonly connected to the pixels, or at a middle portion of the first power line connected to the at least one of the pixels, and transmit data corresponding to the voltage magnitude or the current amount to the image display determiner.

The image display determiner may be configured to compare the current amount of the first power line with a reference current amount, and supply an image display control signal of the next frame to the panel driver when the current amount of the first power line becomes equal to or less than the reference current amount.

The image display determiner may be configured to compare the voltage magnitude of the first power line with a reference voltage magnitude, and supply an image display control signal of the next frame to the panel driver when the voltage magnitude of the first power line becomes equal to or less than the reference voltage magnitude.

According to one or more embodiments of the disclosure, a display device includes a display panel including a display area, pixels in the display area, a touch sensor on a front surface of, or formed integrally with, the display panel, touch electrodes aligned on the touch sensor, a touch-driving circuit configured to use the touch electrodes to sense a touch, and a display-driving circuit configure to determine a still image characteristic or a video characteristic corresponding to image data, control supply timing of a data voltage and a pixel-driving control signal to the pixels based on the still image characteristic or the video characteristic, delay at least one frame period of a still image display period from one frame period of a video display period, and adjust an image display timing of a next frame in response to a change of a current amount or a voltage magnitude.

The display-driving circuit may be further configured to detect a load of the pixels using a maximum grayscale value or a maximum luminance value of the image data during the still image display period, and analyze the maximum grayscale value, the maximum luminance value, an average grayscale value, or an average luminance value of the image data to detect the the current amount and the voltage magnitude.

The display-driving circuit may be further configured to delay an image display period of a current frame in a still image display mode, detect a change of the voltage magnitude or the change of the current amount of a first power line electrically connected to at least one of the pixels, and compare the voltage magnitude or the current amount of the first power line with a reference voltage magnitude or a reference current amount to control image display timing of the next frame.

The display-driving circuit may include a maximum grayscale detector for comparing and analyzing grayscale values or luminance values of the image data to detect a maximum grayscale value or a maximum luminance value, a load detector for comparing and analyzing the grayscale values or the luminance values to detect a load of the pixels, an image analyzer for detecting the still image characteristic or the video characteristic according to an analysis result of the maximum grayscale value, the maximum luminance value, an average grayscale value, or an average luminance value of the image data, and an image display current amount analyzer for detecting the maximum grayscale value, the maximum luminance value, the average grayscale value, or the average luminance value, and for detecting the load, a data voltage magnitude applied to at least one pixel among the pixels, and the current amount or the voltage magnitude based on the average grayscale value or the average luminance value.

The display-driving circuit may further include an image display voltage detector for detecting a change of the voltage magnitude or the change of the current amount of a first power line electrically connected to at least one of the pixels, an image display determiner for setting a still image display mode or a video display mode according to the still image characteristic or the video characteristic, for delaying an image display period of a current frame when setting the still image display mode, and for controlling a next frame image display point according to the voltage magnitude and the current amount, and a panel driver configured to stop output of the pixel-driving control signal to delay the image display period of the current frame, and configured to respond to an image display control signal from the image display determiner to control display of an image of the next frame.

The image display voltage detector may be configured to detect the change of the voltage magnitude or the change of the current amount at one terminal of the first power line commonly connected to the pixels, or at a middle portion of the first power line connected to at least one of the pixels, and transmit data corresponding to the voltage magnitude and the current amount to the image display determiner.

The image display determiner may be configured to compare the voltage magnitude with a reference voltage magnitude, and supply an image display control signal of the next frame to the panel driver when the voltage magnitude becomes equal to or less than the reference voltage magnitude.

A display device according to one or more embodiments of the present disclosure can reduce power consumption by adjusting an emission period and a frame transition period of pixels according to the display image characteristics, such as still images, moving images, and screen transition images.

In addition, the display device according to one or more embodiments of the present disclosure can adjust the charging period of the image data voltage of the pixels, that is, the frame start period, according to changes in voltage magnitude or the amount of current supplied to the pixels during the period when the image is displayed by reducing the power consumption. Accordingly, degradation of image quality can be reduced or prevented even in the driving period with reduced power consumption.

However, the aspects of the present disclosure are not limited to the aforementioned aspects, and various other aspects are included in the present disclosure.

BRIEF DESCRIPTION OF THE DRAWINGS

The above and other aspects of the present disclosure will become more apparent by describing in detail embodiments thereof with reference to the attached drawings, in which.

DETAILED DESCRIPTION

Figure 1:
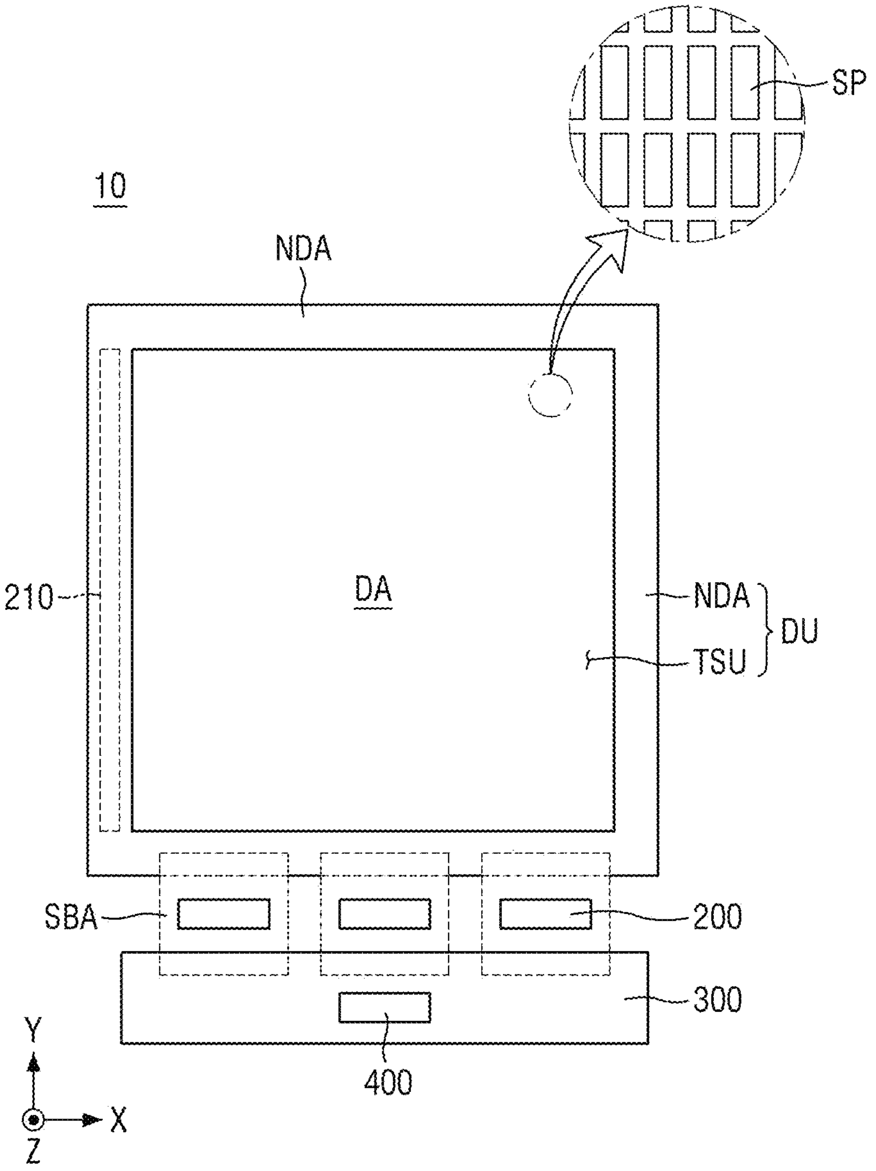
FIG. 1 is a plan view illustrating a configuration of a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
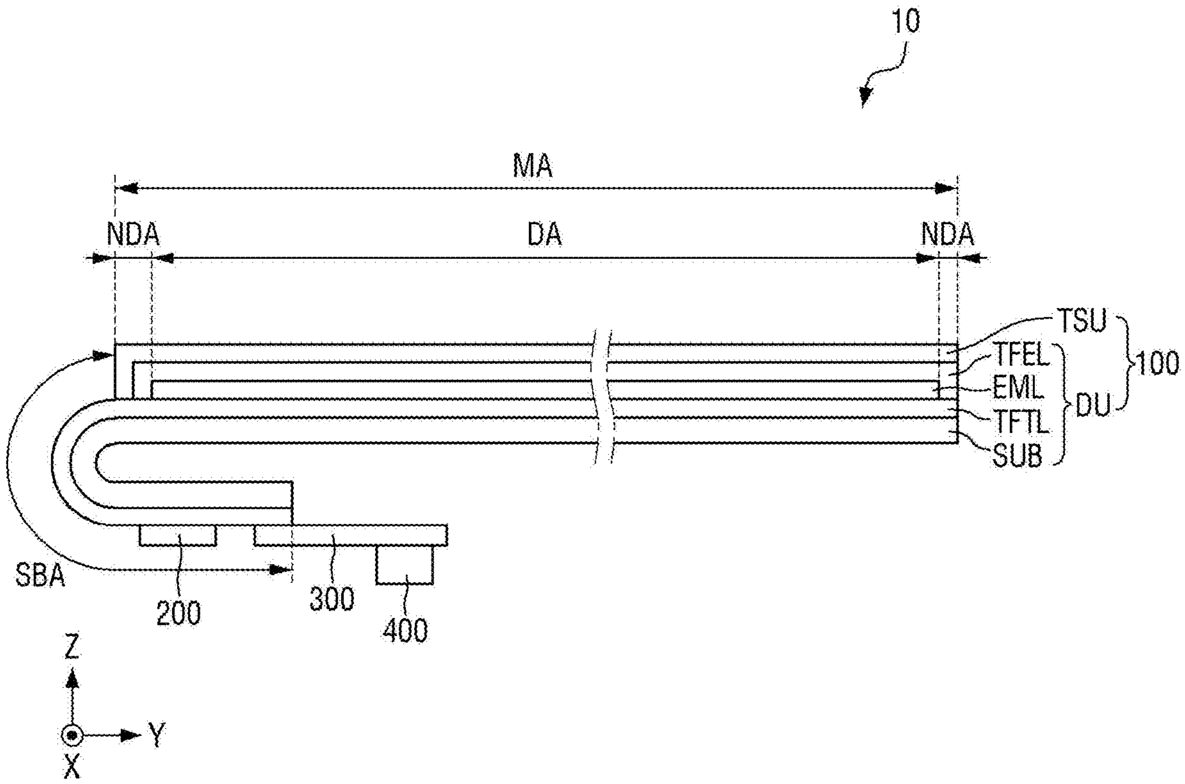
FIG. 2 is a side cross-sectional view illustrating the display device of FIG. 1 in detail.

FIG. 1 is a plan view illustrating a configuration of a display device according to one or more embodiments of the present disclosure. FIG. 2 is a side cross-sectional view illustrating the display device of FIG. 1 in detail.

Referring to FIGS. 1 and 2, a display device 10 according to one or more embodiments may be applied to portable electronic devices, such as tablet personal computer (PC), portable multimedia player (PMP), navigation, ultra mobile PC (UMPC), e-book, e-notebook, mobile phone, smart phone, mobile communication terminal, etc. For example, the display device 10 may be applied to a display of a television, a laptop computer, a monitor, a billboard, or the Internet of Things (IOT).

The display device 10 according to one or more embodiments may be variously classified according to a display method. For example, the display device 10 may be classified into an organic light-emitting diode display (OLED), an inorganic light-emitting display (EL), a quantum dot light-emitting display (QED), a micro-LED display, a nano-LED display, a plasma display panel (PDP), a field emission display (FED), a liquid crystal display (LCD), an electrophoretic display (EPD), etc. Hereinafter, an organic light-emitting diode display (OLED) will be described as an example of the display device 10 according to one or more embodiments, and unless a special distinction is required, the organic light-emitting diode display (OLED) may be abbreviated as the display device 10. The display device 10 is not limited to the organic light-emitting diode display (OLED), and other display devices listed above or known in the art may be applied within the scope of sharing technical spirits.

The display device 10 according to one or more embodiments may have a rectangular shape, a square shape, a circular shape, an elliptical shape, or a quadrate shape in plan view. For example, when the display device 10 is a mobile device, such as a tablet PC, the display device 10 may have a rectangular shape with a long side positioned in a horizontal direction. However, the present disclosure is not limited thereto, and the long side of the display device 10 may be positioned in a vertical direction, and the display device 10 may be rotatably installed, such that the long side of the display device 10 may also be variably positioned in the horizontal or vertical direction.

The display device 10 includes a display panel 100, a display-driving circuit 200, and a touch-sensing module including a touch sensor TSU and a touch-driving circuit 400.

For example, the display panel 100 of the display device 10 includes a display DU for displaying an image, and the touch sensor TSU for sensing a touch of a body portion, such as a finger and/or an electronic pen, is located on the display panel 100. A plurality of pixels SP are formed in a preset arrangement in the display DU of the display panel 100, and an image is displayed by the plurality of pixels SP.

The touch sensor TSU may be mounted on a front surface of the display panel 100 or may be formed integrally with the display panel 100. The touch sensor TSU may include a plurality of touch electrodes to sense a user's touch in a capacitive manner using the touch electrodes.

The display-driving circuit 200 may output data voltages and pixel-driving control signals for driving the plurality of pixels SP arranged in the display DU. The display-driving circuit 200 may supply data voltages to data lines to which the plurality of pixels SP are connected. The display-driving circuit 200 may supply a power voltage to a power line, supply gate control signals to a gate driver 210, and supply the pixel-driving control signals to the plurality of pixels SP.

The display-driving circuit 200 delays at least one frame period of the still image display period from one frame period of the video display period and adjusts the image display timing of the next frame based on changes in voltage magnitude or the amount of current supplied to the plurality of pixels. To this end, the display-driving circuit 200 detects still image or video characteristics of image data input from the outside. Then, the maximum grayscale value (or the maximum luminance value) of the image data for at least one frame is detected, and the grayscale values or luminance values of the image data of one or more frames (e.g., every at least one frame) are compared and analyzed to determine the load of all pixels SP of the one or more frames.

In addition, the display-driving circuit 200 analyzes the grayscale value or luminance value of image data RGB Data of the one or more frames to detect current amount data or voltage magnitude data flowing through the pixels SP, and detects the changes of current amount and voltage magnitude value of a first power line electrically connected to at least one pixel SP, in real time.

The display-driving circuit 200 supplies an image data voltage to each of the pixels SP, and controls the driving timing of the pixels SP, so that an image is displayed for every frame during the image display period of video characteristics. On the other hand, the display-driving circuit 200 delays the image display period of the current frame during the image display period of still image characteristics, and controls the next frame image display timing and image display period according to changes in the current amount or voltage magnitude of the pixels SP displaying the image.

The touch-driving circuit 400 may be electrically connected to the touch sensor TSU. The touch-driving circuit 400 may supply touch-driving signals to the plurality of touch electrodes arranged in the touch sensor TSU, and may sense an amount of change of capacitance between the plurality of touch electrodes. The touch-driving circuit 400 may calculate whether a user's touch input is made, and may calculate touch coordinates, based on the amount of change of capacitance between the plurality of touch electrodes.

Meanwhile, the display-driving circuit 200 may operate as a main processor, or may be formed integrally with the main processor. Accordingly, the display-driving circuit 200 may control the overall function of the display device 10. For example, the display-driving circuit 200 may receive touch data from the touch-driving circuit 400, may determine user's touch coordinates, and may generate digital video data according to the touch coordinates. In addition, the display-driving circuit 200 may execute an application indicated by an icon displayed on the user's touch coordinates. As still another example, the display-driving circuit 200 may receive coordinate data from an electronic pen or the like, may determine touch coordinates of the electronic pen, and may generate digital video data according to the touch coordinates, or also may execute an application indicated by an icon displayed on the touch coordinates of the electronic pen.

Referring to FIG. 2, the display panel 100 may be divided into a main area MA and a sub-area SBA. The main area MA may include a display area DA having pixels SP displaying an image, and a non-display area NDA located around the display area DA. In the display area DA, light may be emitted from light-emitting areas or from opening areas of each pixel SP to display an image. To this end, the pixels SP of the display area DA may include a pixel circuit including switching elements (e.g., thin film transistors), a pixel-defining layer defining the light-emitting area or the opening area, and a self-light-emitting element.

The non-display area NDA may be an area outside the display area DA. The non-display area NDA may be defined as an edge area of the main area MA of the display panel 100. In one or more embodiments, the non-display area NDA may include a gate driver for supplying gate signals to the gate lines, and fan-out lines connecting the display-driving circuit 200 and the display area DA.

The sub-area SBA may extend from one side of the main area MA. The sub-area SBA may include a flexible material that may be bent, folded, rolled, or the like. For example, when the sub-area SBA is bent, the sub-area SBA may overlap the main area MA in the thickness direction (Z-axis direction). The sub-area SBA may include the display-driving circuit 200 and a pad portion connected to a circuit board 300. Optionally, the sub-area SBA may be omitted, and the display-driving circuit 200 and the pad portion may be located in the non-display area NDA.

At least one display-driving circuit 200 may be formed as an integrated circuit (IC) and mounted on the display panel 100 by a chip-on-glass (COG) method, a chip-on-plastic (COP) method, or an ultrasonic-bonding method. For example, the display-driving circuit 200 may be located in a sub-area SBA, and may overlap the main area MA in the thickness direction (Z-axis direction) by bending of the sub-area SBA. As another example, the display-driving circuit 200 may be mounted on the circuit board 300.

The circuit board 300 may be electrically connected to the pad portion of the display panel 100 by an anisotropic conductive film (ACF). To this end, lead lines of the circuit board 300 may be electrically connected to the pad portion of the display panel 100. The circuit board 300 may be a flexible film, such as a flexible printed circuit board, a printed circuit board, or a chip on film.

The substrate SUB of the display panel 100 may be a base substrate or a base member. The substrate SUB may be a flexible substrate that may be bent, folded, rolled, or the like. For example, the substrate SUB may include a glass material or a metal material, but is not limited thereto. As another example, the substrate SUB may include a polymer resin, such as polyimide (PI).

A thin film transistor layer TFTL may be located on the substrate SUB. The thin film transistor layer TFTL may include a plurality of thin film transistors constituting the pixel circuit of the pixels SP. The thin film transistor layer TFTL may further include gate lines, data lines, power lines, gate control lines, fan-out lines connecting the display-driving circuit 200 and the data lines, and lead lines connecting the display-driving circuit 200 and the pad portion. When the gate driver 210 is formed on one side of the non-display area NDA of the display panel 100, the gate driver 210 may also include the thin film transistors.

The thin film transistor layer TFTL may be located in the display area DA, the non-display area NDA, and the sub-area SBA. The thin film transistors, the gate lines, the data lines, and the power lines of each of the pixels of the thin film transistor layer TFTL may be located in the display area DA. The gate control lines and the fan-out lines of the thin film transistor layer TFTL may be located in the non-display area NDA. The lead lines of the thin film transistor layer TFTL may be located in the sub-area SBA.

A light-emitting element layer EML may be located on the thin film transistor layer TFTL. The light-emitting element layer EML may include a plurality of light-emitting elements, in which a first electrode, a light-emitting layer, and a second electrode are sequentially stacked to emit light, and also may include a pixel-defining film for defining pixels. The plurality of light-emitting elements of the light-emitting element layer EML may be located in the display area DA.

An encapsulation layer TFEL may cover an upper surface and side surfaces of the light-emitting element layer EML, and may protect the light-emitting element layer EML. The encapsulation layer TFEL may include at least one inorganic film and at least one organic film for encapsulating the light-emitting element layer EML.

A touch sensor TSU may be located on the encapsulation layer TFEL. The touch sensor TSU may include a plurality of touch electrodes for sensing a user's touch in a capacitance type, and touch lines connecting the plurality of touch electrodes and the touch-driving circuit 400. For example, the touch sensor TSU may sense a user's touch in a self-capacitance method or a mutual capacitance method.

As another example, the touch sensor TSU may be located on a separate substrate located on the display DU. In this case, the substrate supporting the touch sensor TSU may be a base member that encapsulates the display DU.

The plurality of touch electrodes included in the touch sensor TSU may be located in a touch-sensing area overlapping the display area DA. The touch lines of the touch sensor TSU may be located in a touch peripheral area overlapping the non-display area NDA.

The touch-driving circuit 400 may be located on a separate circuit board 300. The touch-driving circuit 400 may be formed as an integrated circuit (IC). As described above, the touch-driving circuit 400 applies the touch-driving signals to the touch electrodes of the touch sensor TSU. In addition, the touch-driving circuit 400 measures an amount of change of charge of a mutual capacitance of each of the touch nodes formed at intersection areas of the touch electrodes. For example, the touch-driving circuit 400 measures a change of capacitance of the touch nodes according to a change of the magnitude of a voltage or an amount of current of a touch-sensing signal received through the touch electrodes. In this way, the touch-driving circuit 400 may determine whether or not a user's touch is made, whether or not a user's approach is made, and the like, according to the amount of change of charge of the mutual capacitance of each of the touch nodes. Here, the touch-driving signal may be a pulse signal having a frequency (e.g., predetermined frequency). The touch-driving circuit 400 calculates whether a touch input of a user's body part, such as a finger, is made, and touch coordinates based on the amount of change of capacitance between the plurality of touch electrodes.

For example, the touch-driving circuit 400 may detect whether the user's touch is made by sequentially supplying the touch-driving signals to the plurality of touch electrodes arranged across each other in the touch sensor TSU, and sequentially measuring the amount of change of charge of the capacitance of each of the touch nodes formed by intersection of the touch electrodes.

Figure 3:
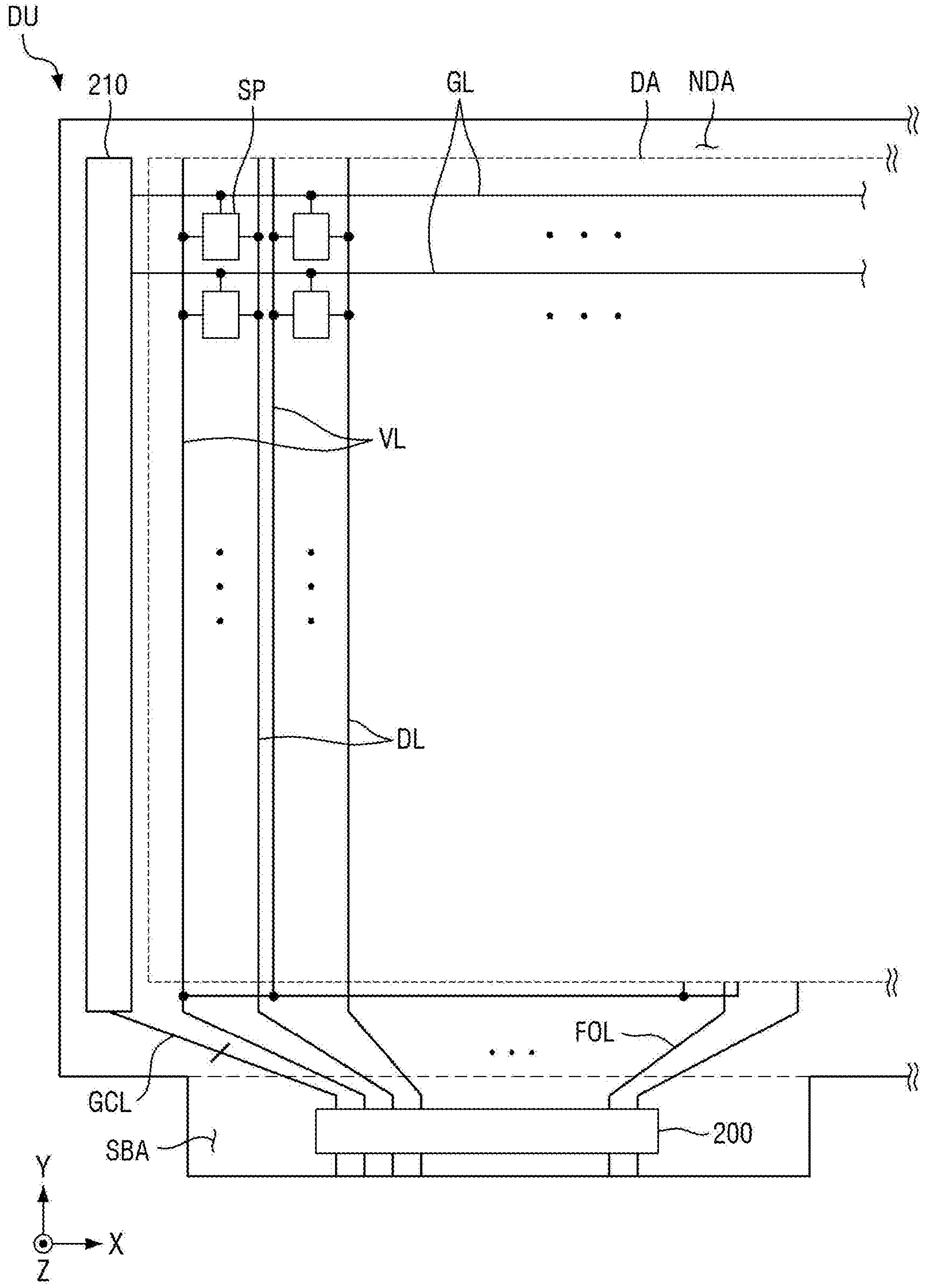
FIG. 3 is a layout view schematically illustrating an example of a display panel according to one or more embodiments.

FIG. 3 is a layout view schematically illustrating an example of a display panel according to one or more embodiments. For example, FIG. 3 is a layout view illustrating a display area DA and a non-display area NDA of the display DU before the touch sensor TSU is formed.

The display area DA, which is an area displaying an image, may be defined as a central area of the display panel 100. The display area DA may include a plurality of pixels SP, a plurality of gate lines GL, a plurality of data lines DL, and a plurality of power lines VL. Each of the plurality of pixels SP may be defined as a minimum unit for outputting light.

The plurality of gate lines GL may supply the scan signals or the gate signals received from the gate driver 210 to the plurality of pixels SP. The plurality of gate lines GL may extend in an X-axis direction, and may be spaced apart from each other in a Y-axis direction intersecting the X-axis direction.

The plurality of data lines DL may supply the data voltage received from the display-driving circuit 200 to the plurality of pixels SP. The plurality of data lines DL may extend in the Y-axis direction, and may be spaced apart from each other in the X-axis direction.

In addition, a plurality of control lines, such as a plurality of light emission control lines and initialization lines, may be formed in the display area DA to supply pixel-driving control signals, such as emission control signals or initialization signals, received from the display-driving circuit 200 to the plurality of pixels SP. In the display area DA, the control lines may extend in the Y-axis direction, and may be spaced apart from each other in the X-axis direction.

Meanwhile, the plurality of power lines VL may supply high-potential and low-potential power voltages received from the display-driving circuit 200 to the plurality of pixels SP. Here, the power voltage may be at least one of a high-potential and low-potential driving voltage, an initialization voltage, and a reference voltage. The plurality of power lines VL may extend in the Y-axis direction, and may be spaced apart from each other in the X-axis direction.

The non-display area NDA may surround the display area DA (e.g., in plan view). The non-display area NDA may include a gate driver 210, fan-out lines FOL, and gate control lines GCL. The gate driver 210 may generate a plurality of gate signals based on the gate control signals, and may sequentially supply the plurality of gate signals to the plurality of gate lines GL according to a set order.

The fan-out lines FOL may extend from the display-driving circuit 200 to the display area DA. The fan-out lines FOL may supply the data voltage received from the display-driving circuit 200 to the plurality of data lines DL.

The gate control line GCL may extend from the display-driving circuit 200 to the gate driver 210. The gate control line GCL may supply the gate control signal received from the display-driving circuit 200 to the gate driver 210.

The display-driving circuit 200 may supply the data voltage to the data lines DL through the fan-out lines FOL. The data voltage may be supplied to the plurality of pixels SP, and may determine luminance of the plurality of pixels SP. The display-driving circuit 200 may supply the gate control signals to the gate driver 210 through the gate control line GCL. In addition, the display-driving circuit 200 may supply the pixel-driving control signals to each control line through separate fan-out lines connected to the control lines of the display area DA.

Figure 4:
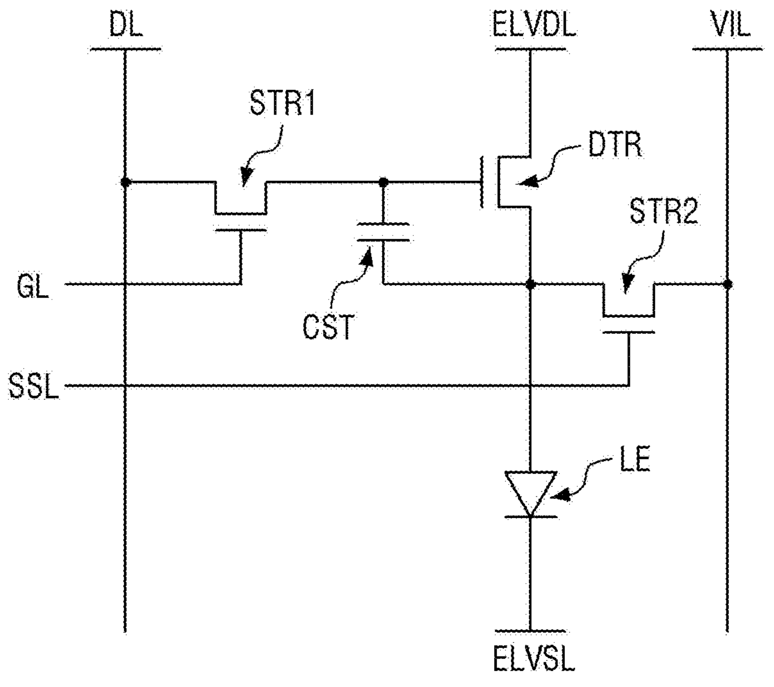
FIG. 4 is an equivalent circuit diagram of a first example of a pixel of the display panel illustrated in FIG. 3.

FIG. 4 is an equivalent circuit diagram of a first example of a pixel of the display panel illustrated in FIG. 3.

Referring to FIG. 4, each of the pixels SP may include three transistors DTR, STR1, STR2 and one storage capacitor CST for light emission of the light-emitting elements LE. The driving transistor DTR adjusts the amount of current flowing from a first power line ELVDL to which the first power voltage is supplied to the light-emitting element LE according to a voltage difference between the gate electrode and the source electrode. The gate electrode of the driving transistor DTR may be connected to a first electrode of a first transistor ST1, a first electrode thereof may be connected to the first power line ELVDL to which the first power voltage is applied, and the second electrode thereof may be connected to a first electrode of the light-emitting element LE.

The first transistor STR1 is turned on by the scan signal of a gate line GL to supply a data voltage of the data line DL to the gate electrode of the driving transistor DTR. The gate electrode of the first transistor STR1 may be connected to the gate line GL, the first electrode thereof may be connected to the data line DL, and the second electrode thereof may be connected to the gate electrode of the driving transistor DTR.

The second transistor STR2 is turned on by the sensing signal of a sensing signal line SSL to connect an initialization voltage line VIL to the second electrode of the driving transistor DTR. The gate electrode of the second transistor ST2 may be connected to the sensing signal line SSL, the first electrode thereof may be connected to the initialization voltage line VIL, and the second electrode thereof may be connected to the second electrode of the driving transistor DTR.

In one or more embodiments, the first electrode of each of the first and second transistors STR1 and STR2 may be a source electrode, and the second electrode thereof may be a drain electrode, but the present disclosure is not limited thereto, and may be vice versa.

The storage capacitor CST is formed between the gate electrode and the second electrode of the driving transistor DTR. The storage capacitor CST stores a difference voltage between a gate voltage and a source voltage or a drain voltage of the driving transistor DTR.

The driving transistor DTR, the first transistor STR1, and the second transistor STR2 may be formed as thin film transistors. Further, in the description of FIG. 4, it is assumed that the driving transistor DTR, the first switching transistor STR1, and the second transistor STR2 are N-type metal oxide semiconductor field effect transistors (MOSFETs), but the present disclosure is not limited thereto. For example, the driving transistor DTR, the first transistor STR1, and the second transistor STR2 may be formed as P-type MOSFETs, or one or more of the driving transistor DTR, the first transistor STR1, or the second transistor STR2 may be formed as N-type MOSFETs, while one or more others may be formed as P-type MOSFETs.

Figure 5:
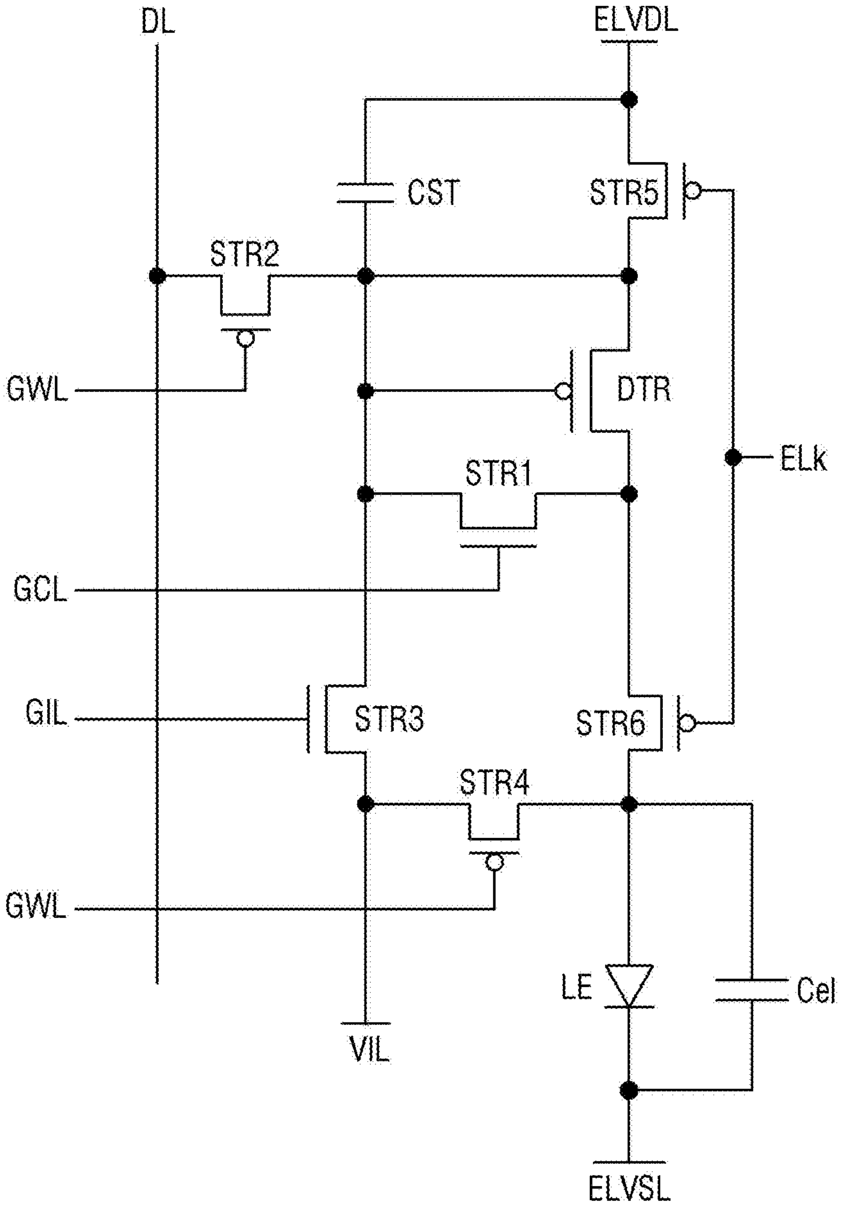
FIG. 5 is an equivalent circuit diagram of a second example of a pixel of the display panel illustrated in FIG. 3.

FIG. 5 is an equivalent circuit diagram of a second example of a pixel of the display panel illustrated in FIG. 3.

Referring to FIG. 5, each pixel SP may include a storage capacitor CST, and one driving transistor DTR and a plurality of switching transistors for light emission of the light-emitting elements LE. In this case, the plurality of switching transistors may include first to sixth transistors STR1, STR2, STR3, STR4, STR5, and STR6.

The driving transistor DTR includes a gate electrode, a first electrode, and a second electrode. The driving transistor DTR controls the amount of a drain-source current (hereinafter, referred to as “driving current”) flowing between the first electrode and the second electrode according to a data voltage applied to the gate electrode.

The storage capacitor CST is formed between the first electrode of the driving transistor DTR and the first power line ELVDL. For example, the first electrode of the storage capacitor CST may be connected to the first power line ELVDL, and the second electrode thereof may be connected to the first electrode of the driving transistor DTR.

When the first electrode of each of the driving transistor DTR and the first to sixth transistors STR1, STR2, STR3, STR4, STR5, and STR6 is a source electrode, the second electrode thereof may be a drain electrode. Alternatively, when the first electrode of each of the driving transistor DTR and the first to sixth transistors STR1, STR2, STR3, STR4, STR5, and STR6 is a drain electrode, the second electrode thereof may be a source electrode.

The driving transistor DTR, the second transistor STR2, the fourth transistor STR4, the fifth transistor STR5, and the sixth transistor STR6 may be configured as P-type metal oxide semiconductor field effect transistors (MOSFETs), and the first transistor STR1 and the third transistor STR3 may be configured as N-type MOSFETs. Alternatively, the first to sixth transistors STR1, STR2, STR3, STR4, STR5, and STR6, and the driving transistor DTR may be formed of a P-type metal oxide semiconductor field effect transistor (MOSFET). However, one or more of of the first to sixth transistors STR1, STR2, STR3, STR4, STR5, and STR6 and the driving transistor DTR being formed as the P-type MOSFETs and the remaining one or more thereof being formed as the N-type MOSFETs are not limiting. For example, it should be noted that the equivalent circuit diagram of the pixel is not limited to that shown in FIGS. 4 and 5. The equivalent circuit diagram of a pixel according to one or more embodiments of the present disclosure may be formed with another known circuit structure that can be employed by a person skilled in the art in addition to the embodiments shown in FIGS. 4 and 5.

Figure 6:
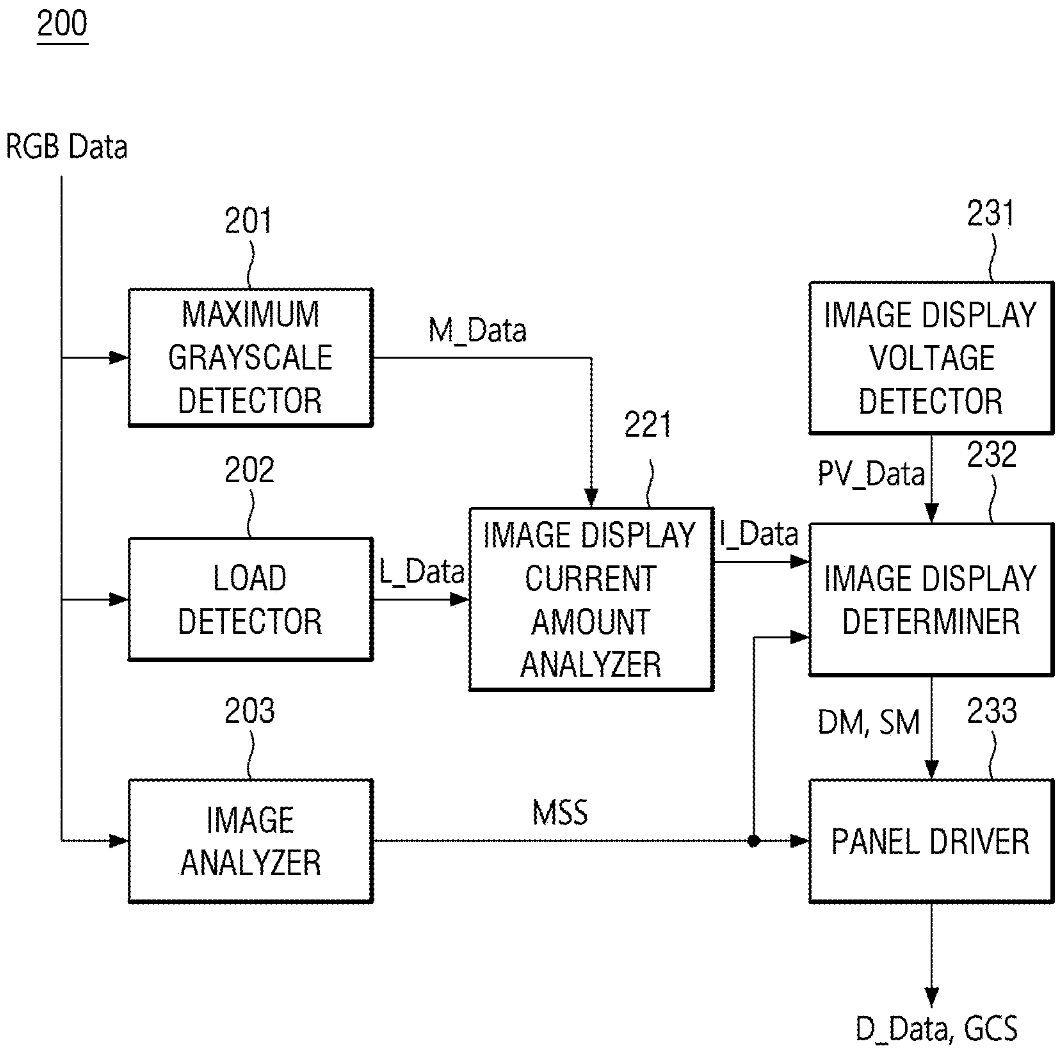
FIG. 6 is a detailed configuration block diagram of the display-driving circuit illustrated in FIGS. 1 to 3.

FIG. 6 is a detailed configuration block diagram of the display-driving circuit illustrated in FIGS. 1 to 3.

Referring to FIG. 6, the display-driving circuit 200 according to one or more embodiments includes a maximum grayscale detector (e.g., maximum grayscale detection unit) 201, a load detector (e.g., load detection unit) 202, an image analyzer (e.g., image analysis unit) 203, an image display current amount analyzer (e.g., image display current amount analysis unit) 221, an image display voltage detector (e.g., image display voltage detection unit) 231, an image display determiner (e.g., image display determination unit) 232, and a panel driver (e.g., panel-driving control unit) 233.

The maximum grayscale detector 201 sorts image data RGB Data input from the outside in units of at least one frame, and detects the maximum grayscale value (or the maximum luminance value) of image data of the one or more frames by comparing and analyzing the grayscale values (or the maximum luminance values) of image data of the one or more frames.

For example, the maximum grayscale detector 201 sequentially compares and analyzes grayscale values (or luminance values) of pixels SP included in the image data of the one or more frames, and detects a maximum grayscale value (or a maximum luminance value) of each frame. Then, the maximum grayscale detector 201 transmits maximum grayscale data M_Data (or maximum luminance data) including the detected maximum grayscale value to the image display current amount analyzer 221.

The load detector 202 compares and analyzes grayscale values or luminance values of the image data of the one or more frames to detect the load of the entire pixels SP of the one or more frames.

For example, the load detector 202 detects and analyzes a maximum grayscale value, a maximum luminance value, an average grayscale value, or an average luminance value from the grayscale values (or the luminance values) of the pixels PX included in the image data of the one or more frames. Then, the load detector 202 calculates or detects the load on at least one pixel SP or all pixels SP based on the maximum grayscale value, the maximum luminance value, the average grayscale value, or the average luminance value of the image data of the one or more frames. The load detector 202 may calculate the load using a preset load detection equation, or may detect the load from a database pre-stored in a memory, such as a lookup table using experimental values. The load detector 202 transmits load data L_Data including the load calculation result value to the image display current amount analyzer 221. The load detector 202 may supply the detected maximum grayscale value, maximum luminance value, average grayscale value, or average luminance value to the image analyzer 203, the image display current amount analyzer 221, the image display determiner 232.

The image analyzer 203 detect still image or moving image characteristics of the image data RGB Data input from the outside based on the comparative analysis result of the maximum grayscale value, the maximum luminance value, the average grayscale value, or the average luminance value of the image data of the one or more frames.

For example, the image analyzer 203 may respectively compare the maximum grayscale value, maximum luminance value, average grayscale value, or average luminance value for the image data RGB Data of previous frames to the maximum grayscale value, maximum luminance value, average grayscale value, or average luminance value for the image data RGB Data of the current frame, and may analyze the difference value to detect the still image or video characteristics of the current frame image data RGB Data. For example, the image analyzer 203 calculates the difference value between the maximum grayscale value, maximum luminance value, average grayscale value, or average luminance value of the current frame image compared to those of the previous frame, and compares them with a preset reference value. Then, if the calculated difference value is detected to be greater than the preset reference value, the image data RGB Data of the current frame may be determined to be video data. On the other hand, if the calculated difference value is detected to be less than the preset reference value, the image data RGB Data of the current frame may be determined to be still image data. In addition, the image analyzer 203 may determine frame image data as screen transition image data at a point when the calculated difference value detected to be less than a preset reference value becomes larger than a preset reference value. The image analyzer 203 sends a detection signal for still image or video characteristics, which is detected and determined for each frame period basis, that is, sends a still image or video detection signal MSS to the image display determiner 232 and the panel driver 233 and/or the like.

The image display current amount analyzer 221 detects a current amount data I_Data or voltage magnitude data corresponding to at least one pixel SP based on the maximum grayscale value, maximum luminance value, average grayscale value, or average luminance value of image data RGB Data of the one or more frames, the load on all pixels SP, the magnitude of the data voltage applied to at least one pixel SP, and at least one grayscale value, voltage value, or luminance value among the grayscale value for at least one pixel SP. For example, the image display current amount analyzer 221 may detect the amount of current or the voltage magnitude applied to the light-emitting element LE for at least one pixel SP according to the maximum grayscale value or the maximum luminance value of the image data RGB Data.

Information on the amount of current or the magnitude of voltage applied to the light-emitting element LE compared to the maximum grayscale value or the maximum luminance value detected by the maximum grayscale detector 201 and/or the like can be preset and stored in a memory and/or the like as experimental values for each characteristic of the display panel 100.

The image display current amount analyzer 221 may detect the amount of current or magnitude of voltage applied to the light-emitting element LE for at least one pixel SP according to the average grayscale value or average luminance value of the image data RGB Data. The image display current amount analyzer 221 transmits the current amount data I_Data or voltage magnitude data of the one or more frames detected in real time to the image display determiner 232.

The image display voltage detector 231 detects changes in the voltage magnitude value and in the amount of current of the first power line ELVDL electrically connected to all pixels SP or at least one pixel SP in the display area DA for the one or more frame periods in real time.

For example, the image display voltage detector 231 detects the change of the amount of current and the voltage magnitude of the first power line ELVDL of the one or more frame periods at one terminal of the first power line ELVDL commonly connected to all pixels SP in real time. In contrast, the image display voltage detector 231 may also detect the change of the amount of current and the voltage magnitude value of the first power line ELVDL at the middle portion of the first power line ELVDL connected to at least one pixel SP among all pixels SP in real time. The image display voltage detector 231 transmits the voltage magnitude value and the current amount data PV_Data of the first power line ELVDL detected for the one or more frame periods to the image display determiner 232.

The image display determiner 232 sets a still image display mode or a video display mode in response to a still image or video detection signal MSS, and when setting the still image display mode, may delay the image display period of the current frame and may control the image display timing and image display period of the next frame according to changes in the amount of current or voltage magnitude of the pixels displaying an image.

For example, the image display determiner 232 may receive the still image or video detection signal MSS input according to the determination of the image analyzer 203, and may set the still image or video display mode. The image display determiner 232 may supply a video display mode signal DM to the panel driver 233 during the video display mode setting period.

When the still image detection signal MSS according to the still image detection result is input from the image analyzer 203, the image display determiner 232 is set in a still image display mode, and an output of the video display mode signal DM is stopped.

When setting the still image display mode, the image display determiner 232 sets the current amount of the current amount data I_Data of the one or more frames received in at least one frame period from the image display current amount analyzer 221 to a current value of the reference current amount. In addition, the voltage magnitude value of the voltage magnitude data of the one or more frames received from the image display current amount analyzer 221 is set to the reference voltage magnitude value.

The image display determiner 232 compares the amount of current of the first power line ELVDL, which is received in at least one frame period through the image display voltage detector 231, with the reference current amount. An image display control signal SM of the next frame may be supplied to the panel driver 233 when the amount of current of the first power line ELVDL becomes equal to or less than the reference current amount.

Alternatively, the image display determiner 232 may compare the voltage magnitude value of the first power line ELVDL, which is received in at least one frame period through the image display voltage detector 231, with the reference voltage magnitude value. The image display control signal SM of the next frame may be supplied to the panel driver 233 when the voltage magnitude value of the first power line ELVDL becomes equal to or less than the reference voltage magnitude value.

When the video display mode signal DM is received from the image display determiner 232, the panel driver 233 may sequentially supply data voltages to the pixels SP in each frame period, and may supply the pixel-driving control signals to the gate driver 210 and to each of the pixels SP to control an image to be displayed for each frame period.

When setting the still image display mode, the panel driver 233 may stop outputting pixel-driving control signals, so that the image display state of the current frame may be maintained, and so that the image display period of the current frame may be delayed.

When the panel driver 233 receives the image display control signal SM from the image display determiner 232, the panel driver 233 may supply data voltages according to the next frame image data to the pixels SP in response to the image display control signal SM. Furthermore, the pixel-driving control signals may be supplied to the gate driver 210 and to each of the pixels SP to control the image of the next frame to be displayed.

Figure 7:
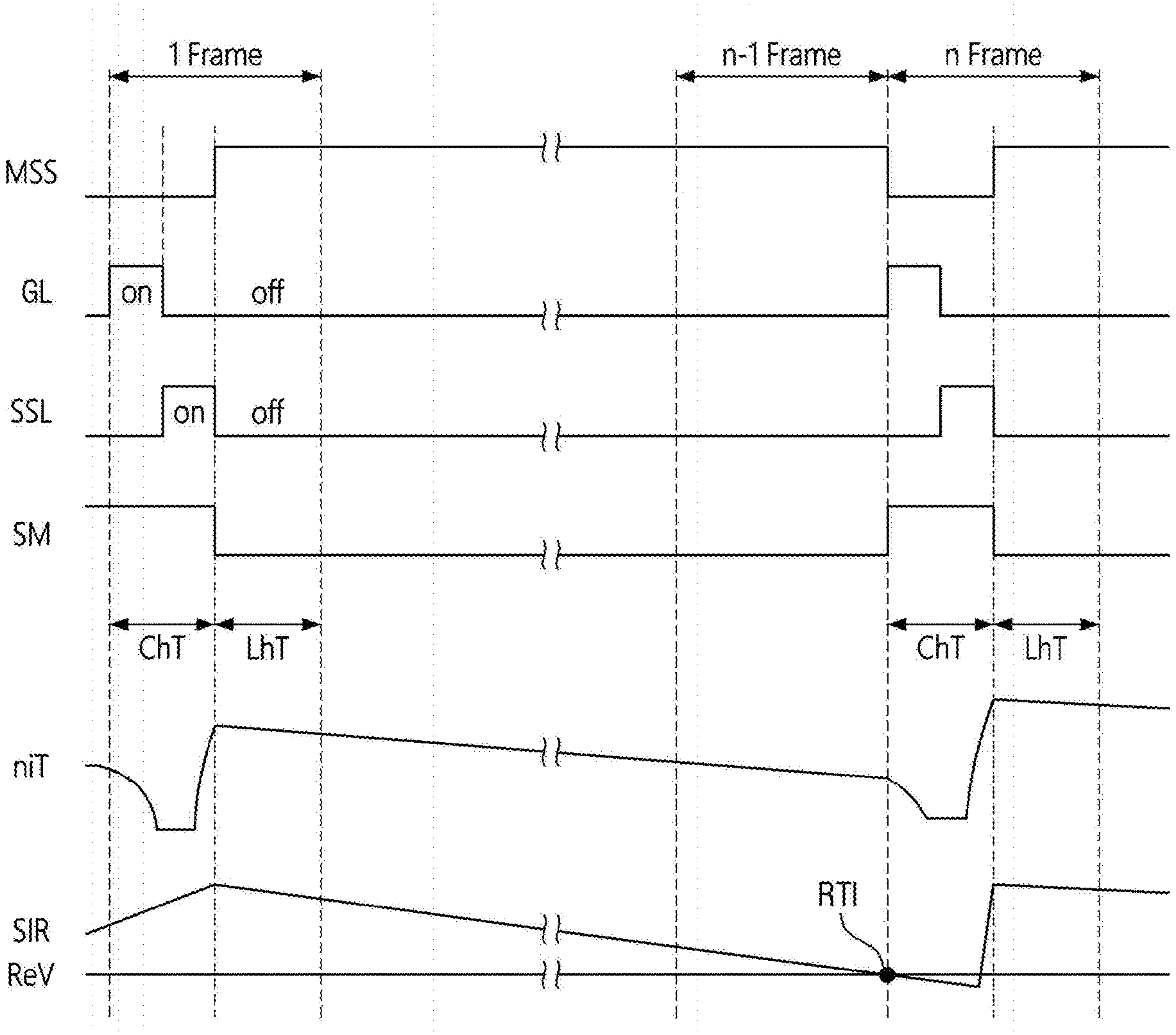
FIG. 7 is a timing diagram illustrating changes in waveforms of pixel-driving control signals and driving voltage of a light-emitting element according to one or more embodiments.

FIG. 7 is a timing diagram illustrating changes in waveforms of pixel-driving control signals and driving voltage of a light-emitting element according to one or more embodiments.

Referring to FIG. 7, the image display determiner 232 of the display-driving circuit 200 supplies the video display mode signal DM to the panel driver 233 when setting the video display mode.

The panel driver 233 may sequentially supply data voltages to the pixels SP in each frame period in response to the video detection signal MSS or video display mode signal DM, and may sequentially supply scan signal and sensing signals to the gate line GL and the sensing signal line SSL to control images to be displayed for each frame period.

The panel driver 233 may divide each frame period into a data-voltage-charging period ChT and a pixel emission period LhT, and may drive each of the pixels SP.

The panel driver 233 may allow pixel-driving control signals, such as scan signal and sensing signal, to be supplied to the pixels SP in the data-voltage-charging period ChT to charge the data voltage to each of the pixels SP. In the data-voltage-charging period ChT among each frame period, the luminance niT and the brightness of the pixels SP may be reduced, and a voltage magnitude value SIR and the current amount of the first power line ELVDL connected to each of the pixels SP may be raised or increased.

During the pixel emission period LhT among each frame period, the light-emitting element LE formed in each of the pixels SP may emit light to display an image. The luminance niT and brightness of the pixels SP may be maintained high and large, and the voltage magnitude value SIR and current amount of the first power line ELVDL connected to each of the pixels SP may gradually decrease or be lowered.

When in still image display mode, the panel driver 233 may stop the output of the pixel-driving control signals, such as a scan signal or a sensing signal, to maintain the image display state of the current frame 1Frame, and to delay the image display period of the current frame 1Frame.

In the still image display mode, the image display determiner 232 may compare the voltage magnitude value SIR of the first power line ELVDL, which is received in at least one frame period through the image display voltage detector 231, with a reference voltage magnitude value ReV. In addition, at a point RTI (e.g., n-Frame period) in which the voltage magnitude value SIR of the first power line ELVDL becomes equal to the reference voltage magnitude value ReV, or becomes less than the reference voltage magnitude, the image display control signal SM of the next frame nFrame may be supplied to the panel driver 233.

In the still image display mode, the panel driver 233 may sequentially supply data voltages to the pixels SP when the image display control signal SM is input, and may supply scan signals and sensing signals to the gate line GL and the sensing signal line SSL, so that the image of the next frame nFrame may be displayed.

Meanwhile, in the still image display mode, the image display determiner 232 may compare the current amount of the first power line ELVDL, which is received in at least one frame period through the image display voltage detector 231, with the reference current amount. In addition, when the current amount of the first power line ELVDL becomes equal to or less than the reference current amount, the image display control signal SM of the next frame may be supplied to the panel driver 233. Accordingly, the image display determiner 232 of the display-driving circuit 200 may adjust the pixel emission period LhT along with the frame transition period of the pixels SP according to the display image characteristics, such as still images, videos, and screen transition images, thereby reducing the amount of power consumption.

In addition, the display-driving circuit 200 may reduce power consumption, and may adjust the pixel emission period LhT and frame transition periods, that is, frame start periods, according to the change of current amount (e.g., current amount of the first power line ELVDL) or the voltage magnitude change of the pixels during the image display period. Accordingly, it is possible to reduce or prevent deterioration of image quality even during the period of operation of the still image display mode, which is driven by reducing power consumption.

Figure 8:
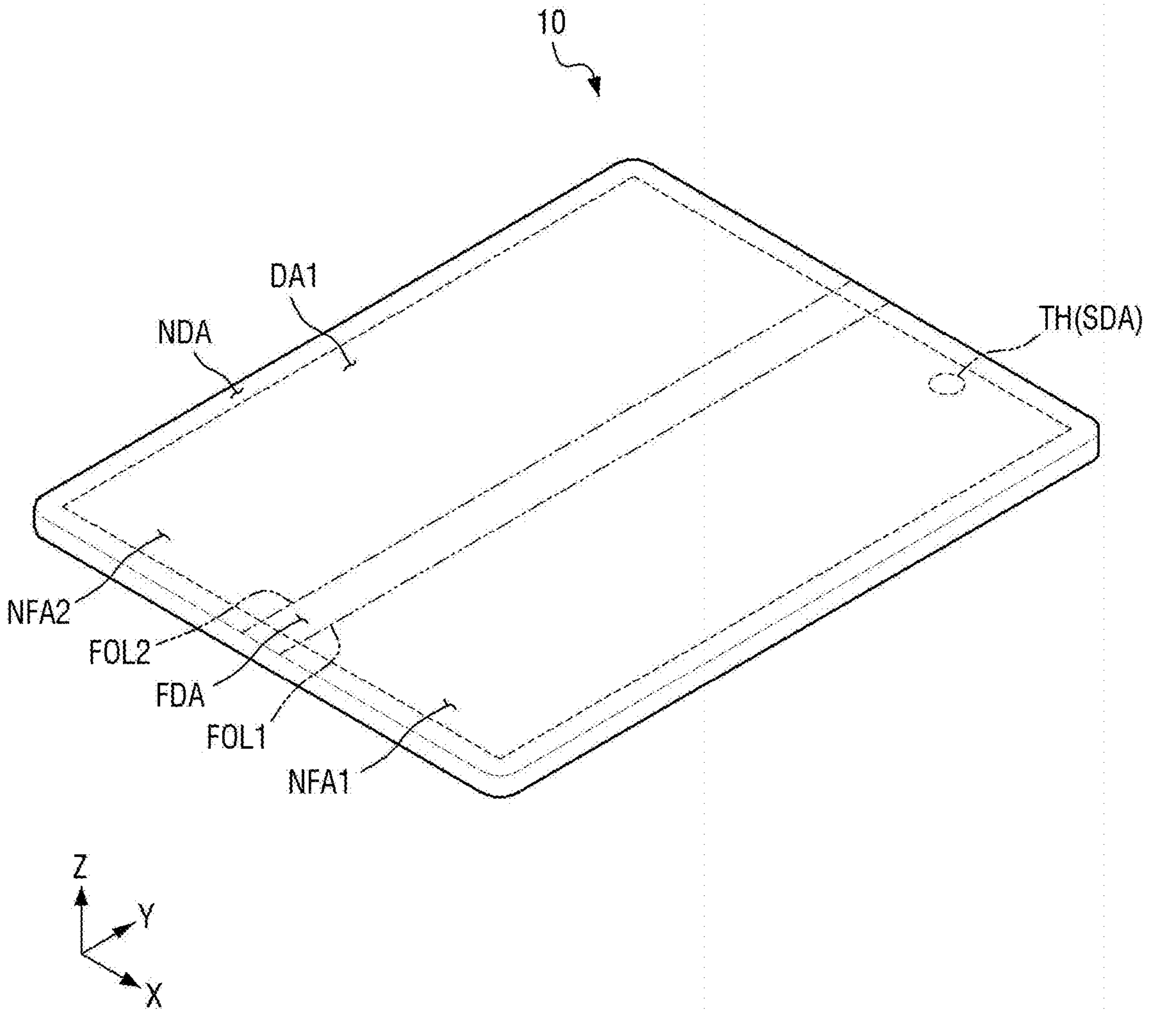
FIGS. 8 and 9 are perspective views illustrating application examples of the display device according to one or more embodiments of the present disclosure.
Figure 9:
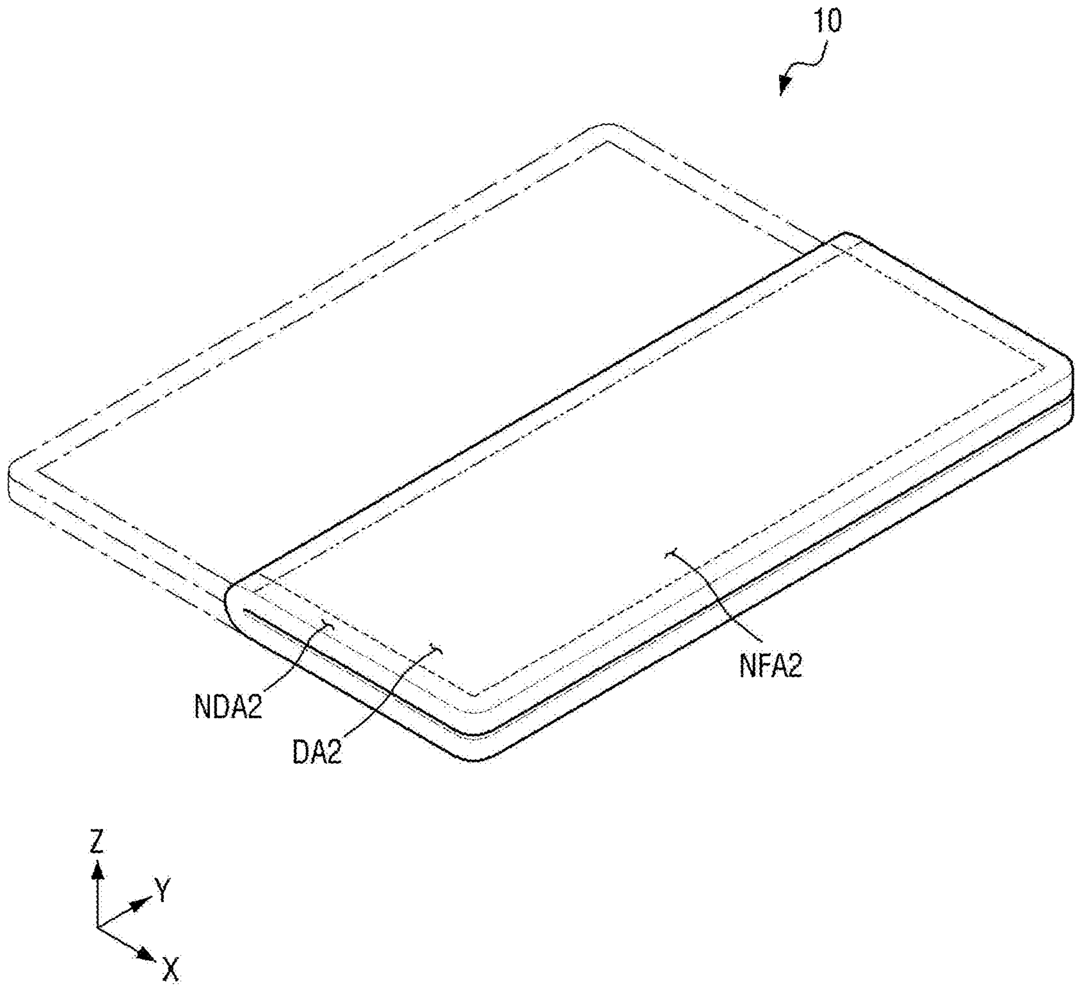

FIGS. 8 and 9 are perspective views illustrating application examples of the display device according to one or more embodiments of the present disclosure.

FIGS. 8 and 9 illustrate examples in which the display device 10 is a foldable display device that is folded in the first direction (X-axis direction). The display device 10 may maintain both a folded state and an unfolded state. The display device 10 may be folded in an in-folding manner in which a front surface thereof is located on an inner side. When the display device 10 is bent or folded in the in-folding manner, the front surfaces of the display device 10 may be located to face each other. Alternatively, the display device 10 may be folded in an out-folding manner in which the front surface thereof is located on an outer side. When the display device 10 is bent or folded in the out-folding manner, rear surfaces of the display device 10 may be located to face each other.

A first non-folding area NFA1 may be located on one side of a folding area FDA, for example, a right side. A second non-folding area NFA2 may be located on the other side of the folding area FDA, for example, a left side. The touch sensor TSU may be located on the first non-folding area NFA1 and the second non-folding area NFA2.

A first folding line FOL1 and a second folding line FOL2 may extend in the second direction (Y-axis direction), and the display device 10 may be folded in the first direction (X-axis direction). Accordingly, because a length of the display device 10 in the first direction (X-axis direction) may be reduced by about half, it may be convenient for the user to carry the display device 10.

Meanwhile, the extending direction of the first folding line FOL1 and the extending direction of the second folding line FOL2 are not limited to the second direction (Y-axis direction). For example, the first folding line FOL1 and the second folding line FOL2 may extend in the first direction (X-axis direction), and the display device 10 may be folded in the second direction (Y-axis direction). In this case, a length of the display device 10 in the second direction (the Y-axis direction) may be reduced by about half. Alternatively, the first folding line FOL1 and the second folding line FOL2 may extend in a diagonal direction between the first direction (X-axis direction) and the second direction (Y-axis direction) of the display device 10. In this case, the display device 10 may be folded in a triangular shape.

When the first folding line FOL1 and the second folding line FOL2 extend in the second direction (Y-axis direction), a length of the folding area FDA in the first direction (X-axis direction) may be shorter than a length thereof in the second direction (Y-axis direction). In addition, a length of the first non-folding area NFA1 in the first direction (X-axis direction) may be longer than the length of the folding area FDA in the first direction (X-axis direction). A length of the second non-folding area NFA2 in the first direction (X-axis direction) may be longer than the length of the folding area FDA in the first direction (X-axis direction).

A first display area DA1 may be located on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be located on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 8 and 9 illustrate a through hole TH, in which a camera SDA is located, is in the first non-folding area NFA1, but the present disclosure is not limited thereto. The through hole TH or the camera SDA may be located in the second non-folding area NFA2 or in the folding area FDA.

Figure 10:
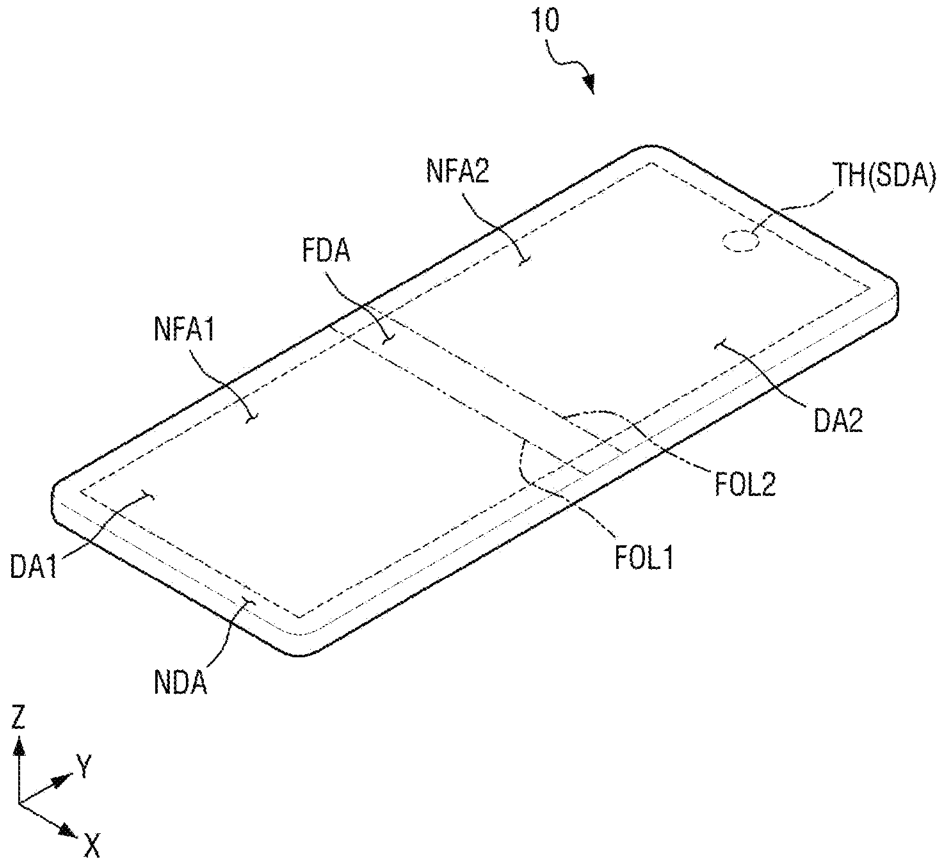
FIGS. 10 and 11 are perspective views illustrating application examples of a display device according to one or more other embodiments of the present disclosure.
Figure 11:
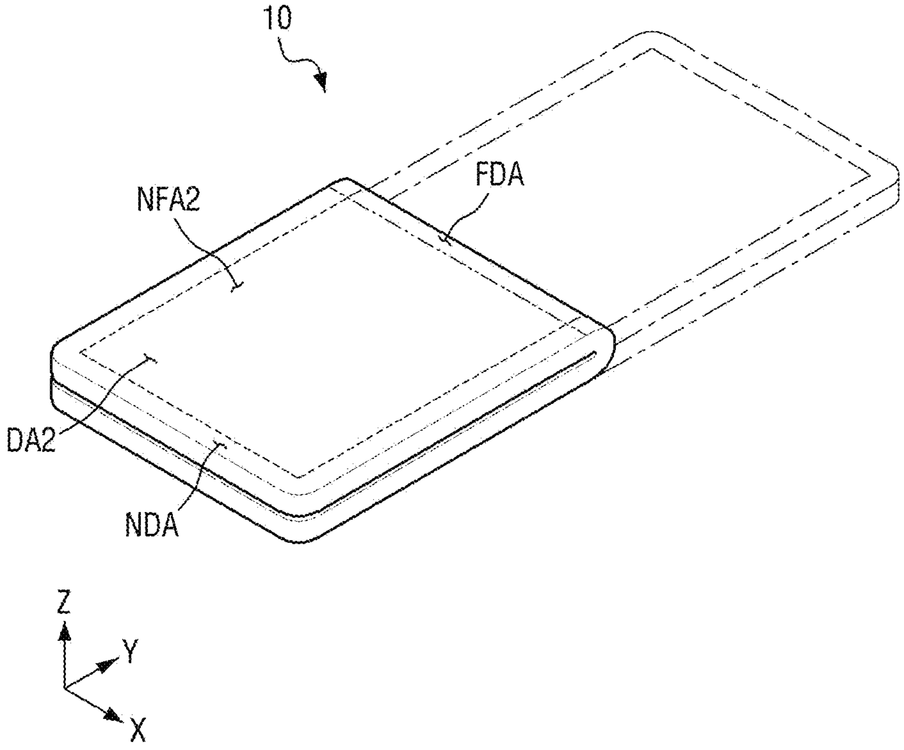

FIGS. 10 and 11 are perspective views illustrating application examples of a display device according to one or more other embodiments of the present disclosure.

FIGS. 10 and 11 illustrate examples in which the display device 10 is a foldable display device that is folded in the second direction (Y-axis direction). The display device 10 may maintain both a folded state and an unfolded state. The display device 10 may be folded in an in-folding manner in which a front surface thereof is located on an inner side. When the display device 10 is bent or folded in the in-folding manner, the front surfaces of the display device 10 may be located to face each other. Alternatively, the display device 10 may be folded in an out-folding manner in which the front surface thereof is located on an outer side. When the display device 10 is bent or folded in the out-folding manner, rear surfaces of the display device 10 may be located to face each other.

The display device 10 may include a folding area FDA, a first non-folding area NFA1, and a second non-folding area NFA2. The folding area FDA may be an area in which the display device 10 is folded, and the first non-folding area NFA1 and the second non-folding area NFA2 may be areas in which the display device 10 is not folded. The first non-folding area NFA1 may be located on one side of the folding area FDA, for example, a lower side. The second non-folding area NFA2 may be located on the other side of the folding area FDA, for example, an upper side.

The touch sensor TSU may be located on the first non-folding area NFA1 and the second non-folding area NFA2.

On the other hand, the folding area FDA may be an area bent with a curvature (e.g., predetermined curvature) at the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

As illustrated in FIGS. 10 and 11, the first folding line FOL1 and the second folding line FOL2 may extend in the first direction (X-axis direction), and the display device 10 may be folded in the second direction (Y-axis direction). Accordingly, because a length of the display device 10 in the second direction (Y-axis direction) may be reduced by about half, it may be convenient for a user to carry the display device 10.

Meanwhile, the extending direction of the first folding line FOL1 and the extending direction of the second folding line FOL2 are not limited to the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (the X-axis direction) may be reduced by about half. Alternatively, the first folding line FOL1 and the second folding line FOL2 may extend in a diagonal direction between the first direction (X-axis direction) and the second direction (Y-axis direction) of the display device 10. In this case, the display device 10 may be folded in a triangular shape.

When the first folding line FOL1 and the second folding line FOL2 extend in the first direction (X-axis direction) as illustrated in FIGS. 10 and 11, a length of the folding area FDA in the second direction (Y-axis direction) may be shorter than a length thereof in the first direction (X-axis direction). In addition, a length of the first non-folding area NFA1 in the second direction (Y-axis direction) may be longer than the length of the folding area FDA in the second direction (Y-axis direction). In addition, a length of the second non-folding area NFA2 in the second direction (Y-axis direction) may be longer than the length of the folding area FDA in the second direction (Y-axis direction).

A first display area DA1 may be located on the front surface of the display device 10. The first display area DA1 may overlap the folding area FDA, the first non-folding area NFA1, and the second non-folding area NFA2. Therefore, when the display device 10 is unfolded, an image may be displayed in a front direction in the folding area FDA, the first non-folding area NFA1, and the second non-folding area NFA2 of the display device 10.

A second display area DA2 may be located on the rear surface of the display device 10. The second display area DA2 may overlap the second non-folding area NFA2. Therefore, when the display device 10 is folded, an image may be displayed in the front direction in the second non-folding area NFA2 of the display device 10.

FIGS. 10 and 11 illustrate that a through hole TH, in which a camera SDA is located, is located in the second non-folding area NFA2, but the present disclosure is not limited thereto. The through hole TH may be located in the first non-folding area NFA1 or in the folding area FDA.

In concluding the detailed description, those skilled in the art will appreciate that many variations and modifications can be made to the embodiments without substantially departing from the aspects of the present disclosure. Therefore, the disclosed embodiments of the disclosure are used in a generic and descriptive sense only and not for purposes of limitation.

What is claimed is:

1. A display device comprising:
a display panel comprising a display area;
pixels arranged in the display area; and
a display-driving circuit configured to:
determine whether an image comprises a still image or a video image;
control a supply timing of a data voltage and a pixel-driving control signal to the pixels according to a determination result of the image;
delay at least one frame period of a still image display period from one frame period of a video display period;
adjust an image display timing of a next frame in response to a change of a current amount or a change in a voltage magnitude; and
compare the voltage magnitude or the current amount with a reference voltage magnitude or a reference current amount to control the image display timing of the next frame and an image display period according to a comparison result.

2. The display device of claim 1, wherein the display-driving circuit is further configured to:
detect a load of the pixels using a maximum grayscale value or a maximum luminance value of image data during the still image display period; and
analyze the maximum grayscale value, the maximum luminance value, an average grayscale value, or an average luminance value of the image data to detect the current amount and the voltage magnitude.

3. The display device of claim 2, wherein the display-driving circuit is further configured to:
delay the image display period of a current frame in the still image display period; and
detect the change of the voltage magnitude and the change of the current amount of a first power line electrically connected to at least one of the pixels.

4. The display device of claim 1, wherein the display-driving circuit comprises:
a maximum grayscale detector for comparing and analyzing grayscale values or luminance values of image data to detect a maximum grayscale value and a maximum luminance value;
a load detector for comparing and analyzing the grayscale value or the luminance value to detect a load of at least one of the pixels;
an image analyzer for detecting a still image characteristic or a video characteristic of the image data according to a comparison result of the maximum grayscale value, the maximum luminance value, an average grayscale value, or an average luminance value of the image data; and an image display current amount analyzer for detecting the maximum grayscale value, the maximum luminance value, the average grayscale value, or the average luminance value, and for detecting the load, a data voltage magnitude applied to at least one of the pixels, and the current amount or the voltage magnitude corresponding to the at least one of the pixels based on the average grayscale value or the average luminance value.

5. The display device of claim 4, wherein the display-driving circuit further comprises:

an image display voltage detector for detecting the change of the voltage magnitude or the change of the current amount of a first power line electrically connected to the at least one of the pixels;

an image display determiner for setting a still image display mode or a video display mode according to the still image characteristic or the video characteristic, for delaying an image display period of a current frame when setting the still image display mode, and for controlling a next frame image display point and an image display period according to the voltage magnitude and the current amount of the first power line; and a panel driver for stopping output of the pixel-driving control signal to delay the image display period of the current frame in the still image display period, and for responding to an image display control signal from the image display determiner to control display of an image of the next frame.

6. The display device of claim 4, wherein the maximum grayscale detector is configured to sequentially compare and analyze the grayscale values or the luminance values to detect the maximum grayscale value or the maximum luminance value of at least one frame, and is configured to transmit the maximum grayscale value to the image display current amount analyzer.

7. The display device of claim 6, wherein the load detector is configured to calculate the load using the maximum grayscale value, the maximum luminance value, the average grayscale value, or the average luminance value, and using a preset calculation or data base of a memory.

8. The display device of claim 6, wherein the image analyzer is configured to respectively compare the maximum grayscale value, the maximum luminance value, the average grayscale value, or the average luminance value of the image data of a previous frame with the maximum grayscale value, the maximum luminance value, the average grayscale value, or the average luminance value of the image data of a current frame to detect the still image characteristic or the video characteristic of the image data of the current frame.

9. The display device of claim 5, wherein the image display voltage detector is configured to:

detect the change of the voltage magnitude or the current amount at one terminal of the first power line commonly connected to the pixels, or at a middle portion of the first power line connected to the at least one of the pixels; and transmit data corresponding to the voltage magnitude or the current amount to the image display determiner.

10. The display device of claim 9, wherein the image display determiner is configured to:

compare the current amount of the first power line with the reference current amount; and supply an image display control signal of the next frame to the panel driver when the current amount of the first power line becomes equal to or less than the reference current amount.

11. The display device of claim 9, wherein the image display determiner is configured to:

compare the voltage magnitude of the first power line with the reference voltage magnitude; and supply an image display control signal of the next frame to the panel driver when the voltage magnitude of the first power line becomes equal to or less than the reference voltage magnitude.

12. A display device comprising:

a display panel comprising a display area;

pixels in the display area;

a touch sensor on a front surface of, or formed integrally with, the display panel;

touch electrodes aligned on the touch sensor;

a touch-driving circuit configured to use the touch electrodes to sense a touch; and a display-driving circuit configured to:

determine a still image characteristic or a video characteristic corresponding to image data;

control supply timing of a data voltage and a pixel-driving control signal to the pixels based on the still image characteristic or the video characteristic;

delay at least one frame period of a still image display period from one frame period of a video display period;

adjust an image display timing of a next frame in response to a change of a current amount or a change of a voltage magnitude; and compare the voltage magnitude or the current amount of a first power line with a reference voltage magnitude or a reference current amount to control image display timing of the next frame.

13. The display device of claim 12, wherein the display-driving circuit is further configured to:

detect a load of the pixels using a maximum grayscale value or a maximum luminance value of the image data during the still image display period; and analyze the maximum grayscale value, the maximum luminance value, an average grayscale value, or an average luminance value of the image data to detect the current amount and the voltage magnitude.

14. The display device of claim 13, wherein the display-driving circuit is further configured to:

delay an image display period of a current frame in a still image display mode; and detect the change of the voltage magnitude or the change of the current amount of the first power line electrically connected to at least one of the pixels.

15. The display device of claim 12, wherein the display-driving circuit comprises:

a maximum grayscale detector for comparing and analyzing grayscale values or luminance values of the image data to detect a maximum grayscale value or a maximum luminance value;

a load detector for comparing and analyzing the grayscale values or the luminance values to detect a load of the pixels;

an image analyzer for detecting the still image characteristic or the video characteristic according to an analysis result of the maximum grayscale value, the maximum luminance value, an average grayscale value, or an average luminance value of the image data; and an image display current amount analyzer for detecting the maximum grayscale value, the maximum luminance value, the average grayscale value, or the average luminance value, and for detecting the load, a data voltage magnitude applied to at least one pixel among the pixels, and the current amount or the voltage magnitude based on the average grayscale value or the average luminance value.

16. The display device of claim 15, wherein the display-driving circuit further comprises:

an image display voltage detector for detecting the change of the voltage magnitude or the change of the current amount of the first power line electrically connected to at least one of the pixels;

an image display determiner for setting a still image display mode or a video display mode according to the still image characteristic or the video characteristic, for delaying an image display period of a current frame when setting the still image display mode, and for controlling a next frame image display point according to the voltage magnitude and the current amount; and a panel driver configured to stop output of the pixel-driving control signal to delay the image display period of the current frame, and configured to respond to an image display control signal from the image display determiner to control display of an image of the next frame.

17. The display device of claim 16, wherein the image display voltage detector is configured to:

detect the change of the voltage magnitude or the change of the current amount at one terminal of the first power line commonly connected to the pixels, or at a middle portion of the first power line connected to at least one of the pixels; and transmit data corresponding to the voltage magnitude and the current amount to the image display determiner.

18. The display device of claim 17, wherein the image display determiner is configured to:

compare the voltage magnitude with the reference voltage magnitude, and supply an image display control signal of the next frame to the panel driver when the voltage magnitude becomes equal to or less than the reference voltage magnitude.

* * * * *